United States Patent
Yen et al.

(10) Patent No.: US 8,762,772 B2
(45) Date of Patent: Jun. 24, 2014

(54) METHOD FOR A PLURALITY OF RAID SYSTEMS AND DATA STORAGE SYSTEM THEREOF

(75) Inventors: Chih-Hung Yen, New Taipei (TW); Ming-Sheng Wu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 212 days.

(21) Appl. No.: 13/423,292

(22) Filed: Mar. 19, 2012

(65) Prior Publication Data
US 2013/0145208 A1    Jun. 6, 2013

(30) Foreign Application Priority Data
Dec. 1, 2011    (TW) .............. 100144192 A

(51) Int. Cl.
*G06F 11/00*    (2006.01)
(52) U.S. Cl.
USPC ...................................... 714/6.22
(58) Field of Classification Search
CPC ....... G06F 11/16; G06F 3/06; G06F 11/1092; G06F 11/1088; G06F 11/004; G06F 11/14
USPC ...................................... 714/1–57
See application file for complete search history.

(56) References Cited

U.S. PATENT DOCUMENTS

| | | | |
|---|---|---|---|
| 7,644,304 B2 * | 1/2010 | Kotzur et al. | 714/6.11 |
| 8,065,558 B2 * | 11/2011 | Zwisler et al. | 714/6.22 |
| 8,086,893 B1 * | 12/2011 | MacFarland et al. | 714/3 |
| 2006/0075283 A1 * | 4/2006 | Hartung et al. | 714/5 |
| 2009/0187707 A1 * | 7/2009 | Benhase et al. | 711/114 |
| 2013/0080829 A1 * | 3/2013 | Colline | 714/6.22 |

OTHER PUBLICATIONS

Office action mailed on Jan. 27, 2014 for the Taiwan application No. 100144192, filing date: Dec. 1, 2011, p. 1 line 11~14, p. 2~3 and p. 4 line 1~23.

* cited by examiner

*Primary Examiner* — Nadeem Iqbal
(74) *Attorney, Agent, or Firm* — Winston Hsu; Scott Margo

(57) ABSTRACT

A data storage method for a plurality of RAID systems includes an SAS expander recording information of failure of a disk of a plurality of RAID systems when failure of the disk is detected and reporting the information of failure of the disk to the RAID system server when the RAID system server sends a polling message to the SAS expander or tries accessing the failed disk. In response to the failure information of the failed disk from the SAS expander, the RAID system server sends a command to the SAS expander, to replace the disk with a hot spare disk.

7 Claims, 3 Drawing Sheets

METHOD FOR A PLURALITY OF RAID SYSTEMS AND DATA STORAGE SYSTEM THEREOF

BACKGROUND OF THE INVENTION

1. Field of the Invention

The present invention relates to a utilization method for a plurality of Redundant Array of Independent Disks (RAID) systems and data storage system thereof, and more particularly, to a method for a plurality of RAID systems and data storage system.

2. Description of the Prior Art

A redundant array of independent disks (RAID) system is a storage technology that combines a number of disks into a large disk group, where information is stored dispersedly in the disks, making the storage efficiency greater than stored in one disk. RAID systems are classified into a number of RAID levels, where RAID 0 system, RAID 1 system, RAID 0+1 system and RAID 5 system are most often used. Except RAID 0 system, the other RAID systems provide various forms of redundancy mechanisms. As such, when a disk fails, data stored in the other disks are utilized for recovering damaged data by logical operations, and writing the recovered data onto a hot spare disk, so as to replace the failed disk.

Please refer to FIG. 1, which is a schematic diagram of a known RAID system 100. The RAID system 100 includes a RAID system server 102, disks HD_1-HD_n, and a hot spare disk HSD. In operation of the RAID system 100, when a disk HD_i from the disks HD_1-HD_n fails, the hot spare disk HSD can replace the failed disk HD_i. That is, if data in the failed disk HD_i can be recovered by data stored in the other disks, recovered data are written on the hot spare disk HSD replacing the failed disk HD_i. By such method, the failed disk HD_i can be changed to a new disk.

From the above mentioned, the RAID system 100 can secure data integrity by utilizing a hot spare disk HSD. Generally, a RAID system includes at lease an independent hot spare disk; that is, multiple RAID systems have to deploy different hot spare disks. For example, if there are two RAID systems and only one hot spare disk, only one RAID system can use this hot spare disk. When a disk in the other RAID system fails, the data in the failed disk can not be recovered. Therefore, hot spare disks which can not be shared for different RAID systems may cause inconvenience of usage, and may increase risk of unrecoverable data.

SUMMARY OF THE INVENTION

It is therefore a primary objective of the present invention to provide a method for a plurality of RAID systems and data storage system thereof.

An embodiment of the invention discloses a data storage method for a plurality of RAID systems. The method includes an SAS expander recording failure information of a disk of a plurality of RAID systems when the failed disk is detected. The SAS expander reports the failure information of the failed disk to a RAID system server when the RAID system server sends a polling message to the SAS expander or tries accessing the failed disk. In response to the failure information of the failed disk from the SAS expander, the RAID system server sends a command to the SAS expander to replace the failed disk with a hot spare disk.

An embodiment of the invention further discloses a data storage system, comprising a plurality of RAID systems, each including a plurality of disks and a RAID server, an SAS expander coupled between the plurality of disks and the RAID system server of each of the plurality of RAID systems, and at least one hot spare disk.

The SAS expander records failure information of a disk in a RAID system of the plurality of RAID systems when the disk fails and reports the failure information of the disk to the RAID system server when a RAID system server of the plurality of RAID systems sends a polling message to the SAS expander or tries accessing the failed disk. In response to the failure information of the failed disk from the SAS expander, the RAID system server sends a command to the SAS expander to replace the failed disk with a hot spare disk from the at least one hot spare disk.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
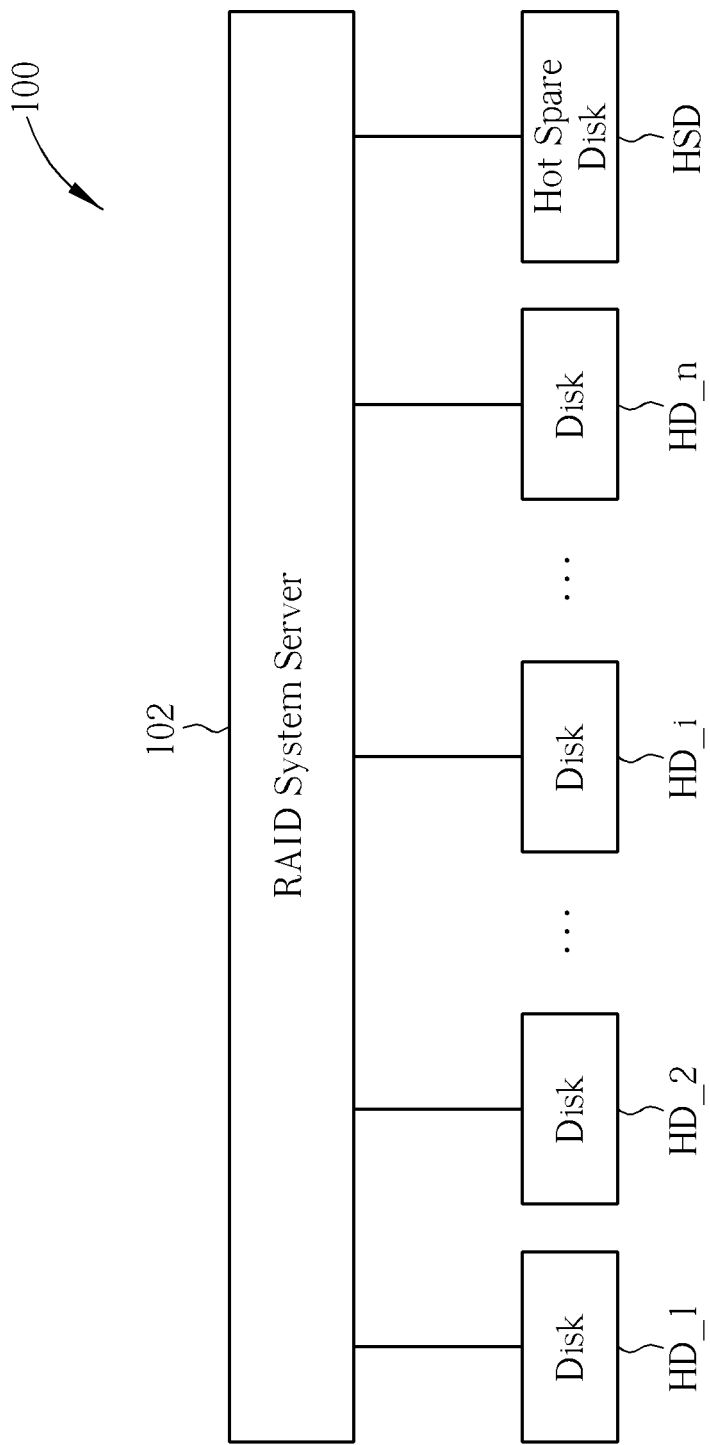
FIG. 1 is a schematic diagram of a known RAID system.
Figure 2:
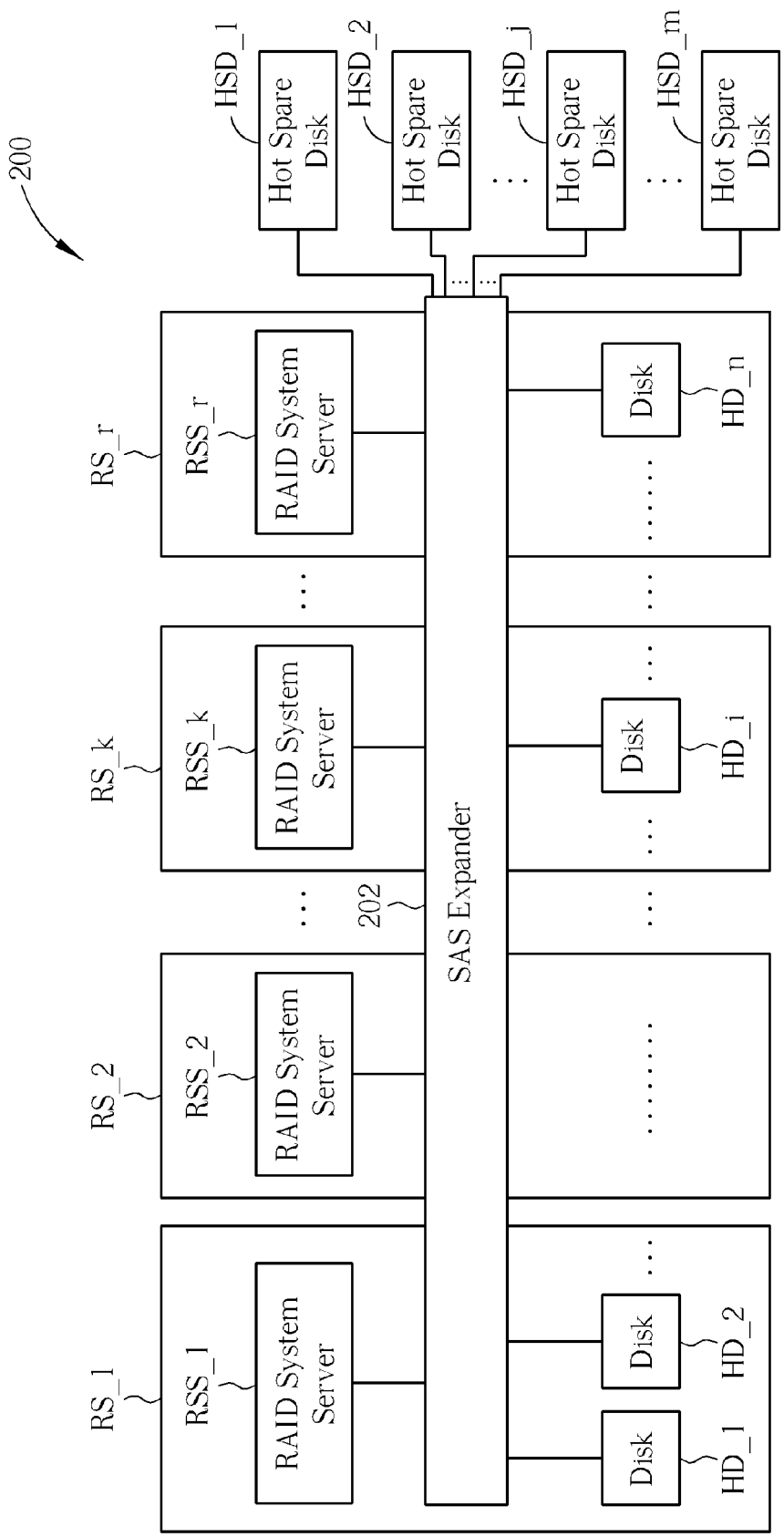
FIG. 2 is a schematic diagram of a data storage system according to an embodiment of the invention.

Please refer to FIG. 2, which is a schematic diagram of a data storage system 200 according to an embodiment of the invention. The data storage system 200 is combination of RAID systems RS_1-RS-r, including RAID system servers RSS_1-RSS_r, a Serial-Attached SCSI (SAS) expander 202, disks HD_1-HD_n and hot spare disks HSD_1-HSD_m. The disks HD_1-HD_n and the hot spare disks HSD_1-HSD_m are distributed in the RAID systems RS_1-RS_r, and the SAS expander 202 is connected between the RAID system servers RSS_1-RSS_r, the disks HD_1-HD_n, and the hot spare disks HSD_1-HSD_m and shared for the RAID systems RS_1-RS_r. The hot spare disks HSD_1-HSD_m are shared for the RAID systems RS_1-RS_r; that is, each of the hot spare disks HSD_1-HSD_m is not distributed to a specific disk in advance.

Figure 3:
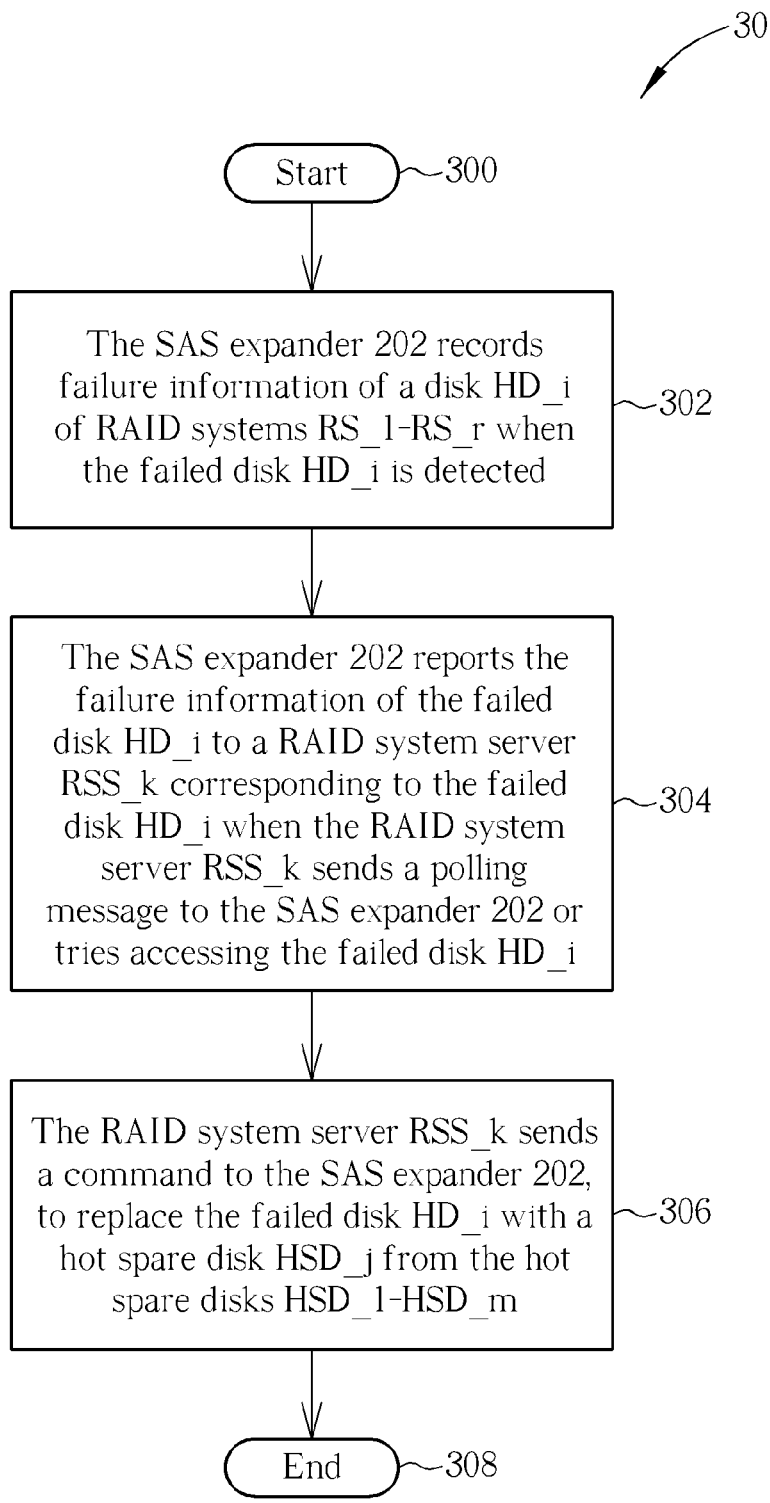
FIG. 3 is a flowchart diagram of a data storage process according to an embodiment of the invention.

For the operating method of the data storage system 200, please further refer to FIG. 3, which is a flowchart diagram of a data storage process 30 according to an embodiment of the invention. The data storage process 30 is an operating process of the data storage system 200, and performed when a disk HD_i from the disks HD_1-HD_n in the data storage system 200 fails, a hot spare disk HSD_j is selected from the hot spare disks HSD_1-HSD_m to replace the failed disk HD_i. The data storage process 30 includes the following steps:

Step 300: Start.

Step 302: The SAS expander 202 records failure information of a disk HD_i of RAID systems RS_1-RS_r when the failed disk HD_i is detected.

Step 304: The SAS expander 202 reports the failure information of the failed disk HD_i to a RAID system server RSS_k corresponding to the failed disk HD_i when the RAID system server RSS_k sends a polling message to the SAS expander 202 or tries accessing the failed disk HD_i.

Step 306: The RAID system server RSS_k sends a command to the SAS expander 202, to replace the failed disk HD_i with a hot spare disk HSD_j from the hot spare disks HSD_1-HSD_m.

Step 308: End.

The data storage process 30 starts when a disk of the data storage system 200 fails. According to Step 302, when the SAS expander 202 finds a failed disk HD_i, the SAS expander 202 records failure information of the disk HD_i, e.g. recording the failure information into a routing table. As well-known by those skilled in the art, the routing table of the SAS expander 202 is utilized for recording connectivity with other devices, including whether a device can connect with another device, and such allocation method is well-known by those in the field, so the description is not given herein. When the RAID system server RSS_k of the RAID system RS_k sends a polling message to the SAS expander 202 to query statuses of the disks of the RAID system RS_k or tries accessing the failed disk HD_i, the SAS expander 202 informs the RAID system server RSS_k of failure information of the disk HD_i according to the information recorded in the routing table. At this time, the RAID system server RSS_k knows that there are hot spare disks HSD_1-HSD_m available from the routing table, and selects a hot spare disk HSD_j from the hot spare disks HSD_1-HSD_m to perform data recovery step. By such method, the failed disk HD_i can be changed to a new disk as a hot spare disk in replace of the hot spare disk HSD_j.

In Step 306, the command sent from the RAID system server RSS_k is used to inform the SAS expander 202 to use the hot spare disk HSD_j for replacing the failed disk HD_i, such command can be a Serial Management Protocol (SMP) command, and not limited to this, as long as that the SAS expander 202 can read and modify the routing table accordingly. After receiving the command, the SAS expander 202 can modify connectivity between the RAID system server RSS_k and the failed disk HD_i, and between the RAID system server RSS_k and the hot spare disk HSD_j, such that the RAID system server RSS_k can access the hot spare disk HSD_j but can not access the failed disk HD_i.

Note that the implementations for the steps of the data storage process 30 are well known by those skilled in the art. For example, each step of the data storage process 30 can be compiled into program code by commands, parameters, and variables of specific program language, and the program code is stored in each of the RAID system servers RSS_1-RSS_r, for selecting a hot spare disk to replace a failed disk when the failed disk is found.

Furthermore, in the embodiments of the invention, relation between the number of hot spare disks and the number of RAID systems is not absolute. In other words, the number of hot spare disks can be more than, equal to, or fewer than the number of RAID systems.

For example, if there is one hot spare disk shared for two RAID systems, when a disk in one RAID system fails, the hot spare disk can be provided for the RAID system to replace the failed disk and perform date recovery procedure to recover data in the failed disk. The failed disk can be replaced with a new hot spare disk shared for each RAID system.

In the known art, hot spare disks which can not be shared for different RAID systems may cause inconvenience of usage, and may increase risk of unrecoverable data. In comparison, in the embodiments of the present invention, each hot spare disk can be shared for each RAID system, such that the risk of unrecoverable data due to failure of a disk can be reduced, improving upon the shortcomings existing in the known art.

In conclusion, in the data storage system of the present invention, each hot spare disk can be shared for a plurality of RAID systems, such that convenience of usage can be enhanced, risk of unrecoverable data due to failure of a disk can be reduced, and cost of hot spare disks deployment can be effectively reduced because the number of hot spare disks can be fewer that the number of RAID systems.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage method for a plurality of RAID systems, comprising:
    an SAS expander recording failure information of a disk of a plurality of RAID systems when the failed disk is detected;
    the SAS expander reporting the failure information of the failed disk to a RAID system server when the RAID system server sends a polling message to the SAS expander or tries accessing the failed disk; and
    the RAID system server sending a command to the SAS expander, to replace the failed disk with a hot spare disk.

2. The data storage method of claim 1, wherein the SAS expander comprises a routing table, for recoding statuses of all disks of the plurality of RAID systems and corresponding RAID system to each of the disks.

3. The data storage method of claim 2, wherein the SAS expander modifies the routing table when the failed disk is replaced with the hot spare disk.

4. The data storage method of claim 1, wherein the command sent from the RAID system server is for selecting the hot spare disk from a plurality of hot spare disks to replace the failed disk.

5. A data storage system, comprising:
    a plurality of RAID systems, each comprising:
        a plurality of disks; and
        a RAID server;
    an SAS expander, coupled between the plurality of disks and the RAID system server of each of the plurality of RAID systems; and
    at least one hot spare disk;
    wherein the SAS expander records failure information of a disk in a RAID system of the plurality of RAID systems when the disk fails; the SAS expander reports the failure information of the disk to the RAID system server when a RAID system server of the plurality of RAID systems sends a polling message to the SAS expander or tries accessing the failed disk; and the RAID system server sends a command to the SAS expander, to replace the failed disk with a hot spare disk from the at least one hot spare disk.

6. The data storage system of claim 5, wherein the SAS expander comprises a routing table, for recoding statuses of all disks of the plurality of RAID systems and the corresponding RAID systems to each of the disks.

7. The data storage system of claim 6, wherein the SAS expander modifies the routing table when the failed disk is replaced with the hot spare disk.

* * * * *